July 21, 1942.  D. D. ORMSBY  2,290,703
MOTOR VEHICLE
Filed Aug. 23, 1940  3 Sheets-Sheet 1
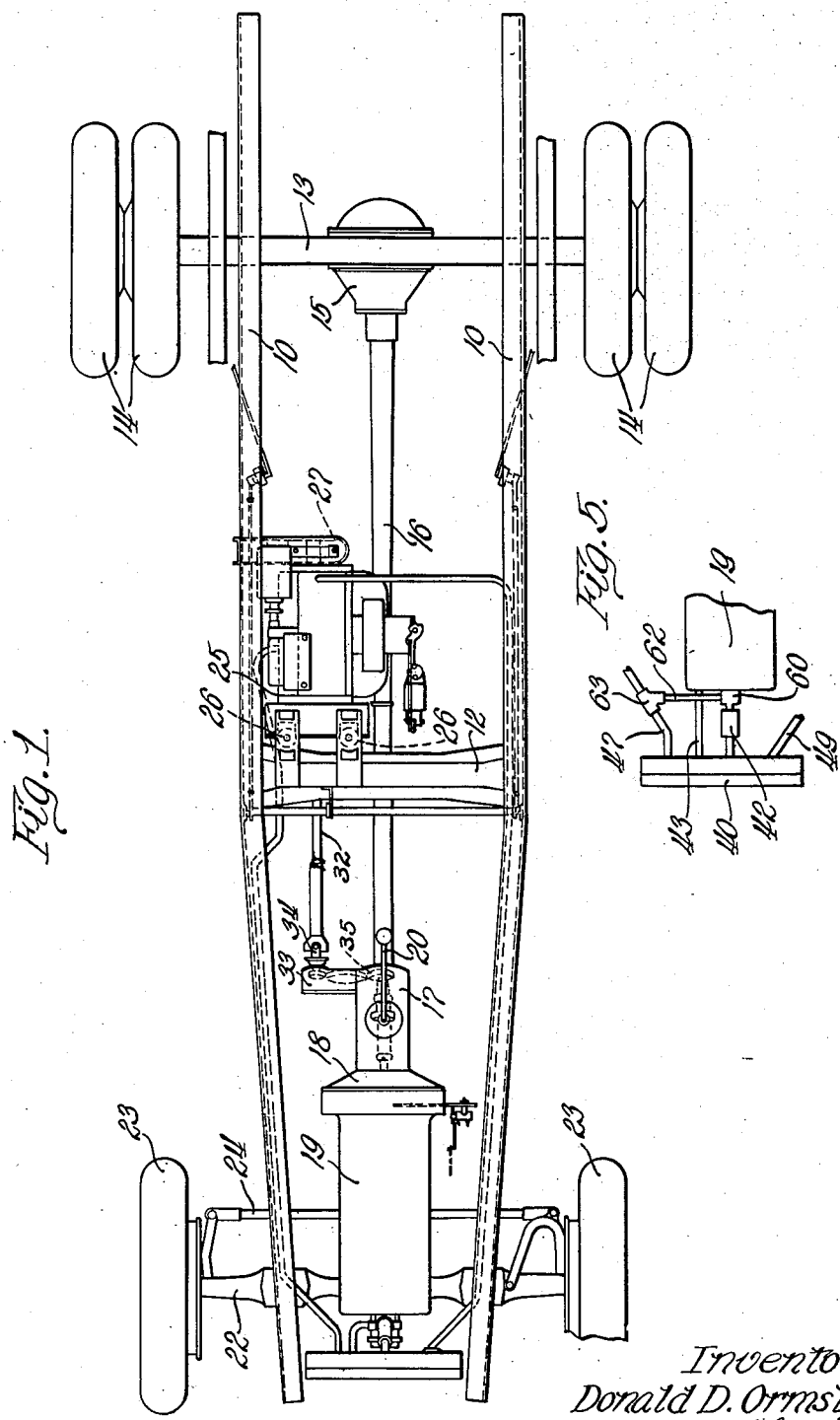
Inventor
Donald D. Ormsby
By Walter E. Schirmer
Atty.

July 21, 1942.  D. D. ORMSBY  2,290,703
MOTOR VEHICLE
Filed Aug. 23, 1940   3 Sheets-Sheet 2
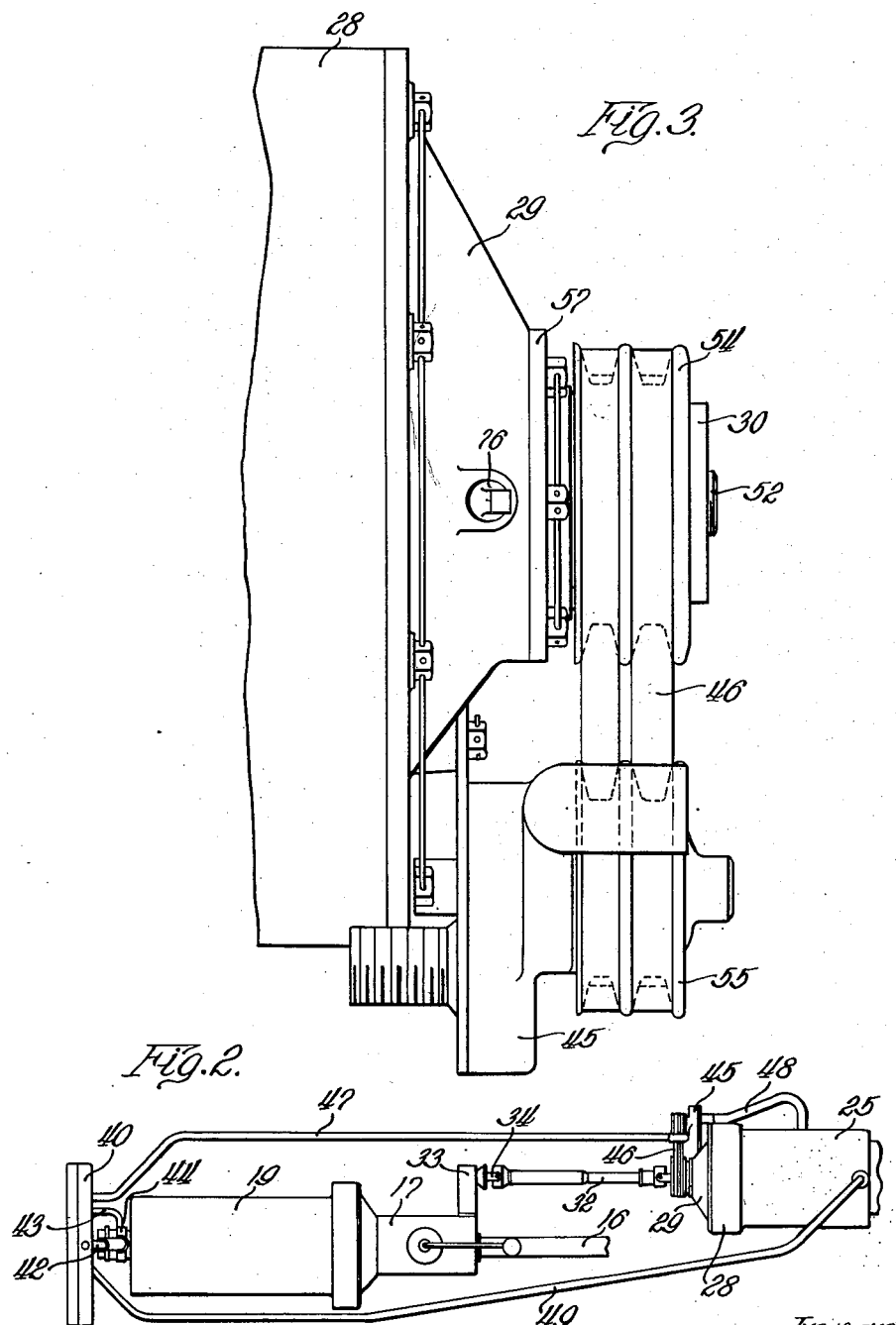
Inventor:
Donald D. Ormsby
By Walter E. Schirmer
Atty.

July 21, 1942.  D. D. ORMSBY  2,290,703
MOTOR VEHICLE
Filed Aug. 23, 1940  3 Sheets-Sheet 3

Inventor:
Donald D. Ormsby
By Walter E. Schirmer
Atty.

Patented July 21, 1942

2,290,703

UNITED STATES PATENT OFFICE 2,290,703

MOTOR VEHICLE

Donald D. Ormsby, Buchanan, Mich., assignor to Clark Equipment Company, Buchanan, Mich., a corporation of Michigan Application August 23, 1940, Serial No. 353,818

8 Claims. (Cl. 60—97)

This invention relates to vehicles, and more particularly is directed to an improved power drive combination for heavy duty vehicles, such as trucks, busses, rail cars and the like.

The present application is a continuation in part of my copending application, Serial No. 256,947, filed February 17, 1939.

The present type of truck or bus now employed is powered to carry predetermined pay loads at fairly consistent speeds over level country. However, it is common knowledge that such vehicles are frequently overloaded, and even when not overloaded, the power in such trucks is insufficient to produce an adequate speed of the vehicle in climbing grades or the like in hilly or mountainous country. As a result, such vehicles crawl up these grades at speeds which are so slow as to cause numerous accidents because of attempts by trailing vehicles to pass the slow moving bus or truck in going up hill. This occurs in spite of highway regulations prohibiting passing under such conditions due mainly to the extremely slow speed of the heavy loaded vehicle and the impatience of the operator of the trailing vehicle.

In attempting to overcome such a situation it has become increasingly apparent that the solution does not lie in trying to prevent passing under such conditions, but rather in speeding up the slow vehicle to a point where it will not unduly retard traffic on grades.

It is believed that speeds of twenty to thirty-five miles per hour, for example, would do much to eliminate the accidents, as at such speeds, traffic would not be impeded to an extent such as to cause disregard for the obvious dangers inherent in passing under such conditions.

One manner in which the speed of the transport vehicle could be increased in climbing grades would be to install larger and more powerful engines therein adequate to maintain the desired speed on grades. However, this is impractical since it would produce uneconomical operation of the power unit under normal driving conditions on flat terrain and the available power would be utilized only occasionally.

One manner of solving this problem has been disclosed in the copending application of George D. Wilcox, Serial No. 246,565, filed December 19, 1938. The present application is considered to be an improvement upon the aforesaid copending application to render the same more positive in operation and to simplify the control system thereof.

Primarily, the present invention is to provide a secondary or booster power unit capable of being coupled into the power train of the vehicle and arranged under automatic control for delivering its full power to the driving mechanism to supplement the main drive under certain predetermined conditions.

It is essential in order to gain the greatest benefit from such a system that the auxiliary or booster engine be controlled in response to predetermined speed and power requirements in the vehicle so that it will be operated only at such times as its power is necessary to maintain a predetermined speed of the vehicle.

Another feature of the present invention of distinct importance is the provision of a cooling system for the booster engine, which is coupled directly into the cooling system of the main or primary engine whereby one radiator common to both engines may be employed. This is of distinct advantage in that it keeps the booster engine at the operating temperature of the main engine so that no difficulty is occasioned in starting the booster engine.

Still another feature of the present invention, in connection with the cooling system, is the mounting of a water pump directly on the housing of the overrunning clutch, this water pump being driven by the constantly rotating portion of the overrunning clutch whereby the water pump is being driven at all times that the primary engine is in operation.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 1 is a top plan view of the chassis embodying the present invention;

Figure 2 is a diagrammatic view of the cooling system for the two units;

Figure 3 is a top plan view of the overrunning clutch housing and water pump mounting;

Figure 5 is a diagrammatic view of a modified construction.

Figure 4:
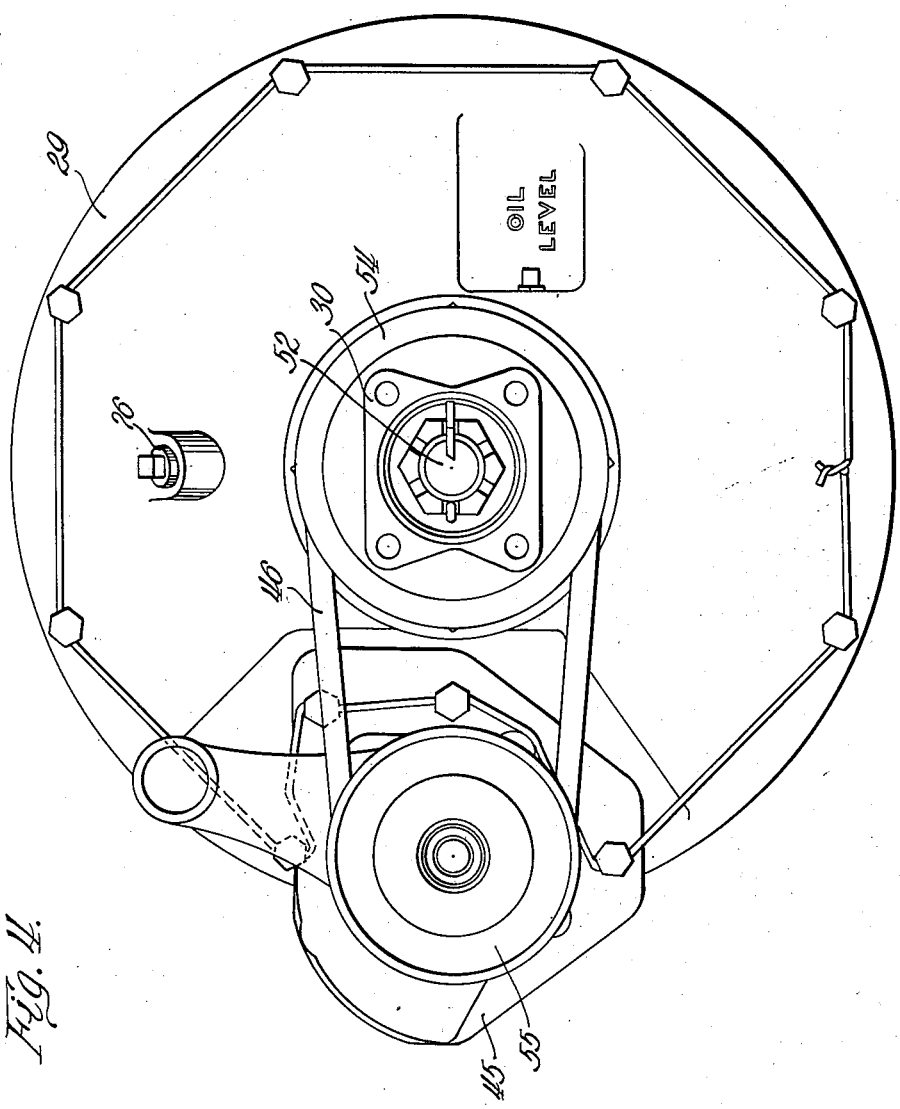
Figure 4 is an end elevational view of the clutch assembly housing plate.

Considering now the invention as shown in the drawings, a truck chassis, which may be either of the tractor or of the conventional type on which a truck body is to be mounted, is shown in Figure 1, and comprises the side rails 10 which are in the form of channels and which are tied together by means of a cross member such as the central cross member 12. At the rear portion of the chassis there is provided an axle housing 13 upon which the dual wheels 14 are mounted at each end and which are driven from an axle mechanism including a differential supported in the differential carrier 15.

Extending forwardly from the carrier 15 is a propeller shaft 16 which may, if desired, be of the torque tube type and which at its forward end is connected to the transmission 17 secured to the clutch housing bell 18 of the main or primary engine 19. The transmission 17 is provided with a conventional gear shift lever 20 utilized for shifting the transmission through the various speed changes.

At the front end of the chassis there is provided the front axle 22 suitably supporting the vehicle through spring members (not shown) and upon which are dirigibly mounted the front wheels 23 which have the steering knuckles thereof connected together by the tie rod 24 in a conventional manner.

A booster or secondary engine is indicated at 25 and is suitably supported upon the frame or chassis of the vehicle by means of rubber biscuits 26 carried in suitable brackets secured to the cross member 12 and by a resilient mounting 27 at the front end of the motor 26 which is secured to the side rail 10. At its rear end the motor 25 is provided with a flywheel housing 28 to which is secured the bell-shaped housing 29 of the overrunning clutch construction and from which extends the companion flange 30 of a universal joint assembly connected to the shaft 32. The shaft 32 is longitudinally extensible by means of a splined telescoping connection, and at its forward end is connected to a gear in a laterally offset housing 33 by means of the universal joint 34. The housing 33 is bolted to the side of the transmission 17 and contains suitable gears meshing with a gear 35 on the countershaft of the transmission. It will thus be apparent that the booster engine 25 is connected through the overrunning clutch in housing 29 to the countershaft of the transmission of the main power plant of the vehicle and thus delivers its torque to the driving train at this point. However, it is within the scope of the present invention to provide for connection of the booster engine at any point of the power train of the vehicle from the rear axle forwardly to the motor 19.

Considering now in detail the cooling system for the vehicle which is shown in Figure 2, the main radiator for both engines is shown at 40. This radiator is of the "Tropic" type; that is, the type of radiator used in tropical climates and has a greatly increased capacity over normal radiators. The radiator 40 has the connections 42 and 43 to the main engine 19 in the customary manner through a water pump 44 carried at the forward end of the motor 19 and driven from the crankshaft thereof.

At the booster engine 25 the overrunning clutch housing 29 has mounted thereon a water pump 45, which water pump is driven through the belt drive 46 from the shaft 32, which shaft is constantly rotating at any time that the main engine 19 is in operation. A suitable conduit 47 leads from the radiator 40 to the inlet side of the booster pump 45. The outlet side of the booster pump 45 communicates through the conduit 48 with the cylinder block of the booster engine 25, and a return connection 49 is provided between the head of the booster engine 25 and the radiator 40.

It will thus be apparent that whenever the main engine is in operation, cooling fluid from the radiator 40 is being forced through the booster engine 25 by means of the pump 45 which is being driven at any time that the main engine is in operation. This insures that the temperature of the booster engine will be maintained at approximately the same temperature as the primary engine; that is, at a normal operating temperature, which greatly facilitates the starting of the booster engine and insures prompt starting, although the booster engine also normally is provided with automatic choking devices for cold weather starting.

Considering now in further detail Figures 2 to 4, inclusive, which show the overrunning clutch construction in conjunction with the pump 45, the clutch housing 29 is piloted into the flywheel housing 28 of the auxiliary engine 25, as indicated clearly in Figure 3. The clutch housing 29 is bell-shaped and has a central journal portion within which is disposed the overrunning clutch mechanism.

The companion flange 30 forming the universal joint connection to the lay shaft 32 is secured in splined engagement to the shaft 52. It will thus be apparent that the shaft 52 is constantly rotating whenever the main engine 19 is in operation.

It is apparent that the pulley 54 which is journalled over the hub portion of the companion flange 30 and is secured for conjoint rotation therewith will thereby be in constant rotation with the shaft 52, and consequently will drive the pulley 55 on the water pump 45 at all times.

The pump 45 is located on the face of the housing 29 by means of suitable cap screws or the like which bolt the same thereto, as indicated generally in Figure 4, which form a part of the series of studs by which the entire housing 29 is bolted to the flywheel housing 28.

It will therefore be apparent that with this overrunning clutch construction the water pump for the secondary engine is constantly in operation, thus insuring that this engine will be maintained at proper operating temperatures to facilitate easy starting. At the same time, the overrunning clutch construction provides for automatically coupling the auxiliary engine to the lay shaft 32 whenever the speed of rotation of the auxiliary engine exceeds that of the lay shaft, thereby allowing a power input from the auxiliary engine to the transmisison of the vehicle.

In the form of the invention shown in Figure 5, I have provided a modified construction in which the radiator 40 at the main engine has the intake line 43 and the return line 42 leading to the upper header of the radiator. However, at the outlet side of the water pump for the outlet line 42 leading to the radiator there is provided a bleeder connection 60 controlled by a thermostat which, through the bleeder line 62, is connected to the inlet connection 47 leading to the water pump 45 of the booster engine. The connection of the bleeder 62 to the line 47 includes a Y connection indicated at 63. The pump 45 is continuously operating to draw this fluid into the booster engine, assisted by the pressure of the main engine water pump. The thermostatic device at 60 thus closes off the line 42 and forces the heated fluid from the main engine 19 through the bleeder connection 62 into the line 47, and consequently through the booster engine to the return line 49 leading to the radiator 40. Until a predetermined temperature has been reached, this bleeder connection is effective to insure heating of the booster engine to a proper temperature for starting and immediately running at full open throttle whenever the main engine is in operation. After the desired temperature has been reached, the thermostat 60 opens the line 42, and consequently normal flow is re-established.

This construction is particularly desirable in situations where cold weather starting is encountered, as it provides for warming the booster engine to a temperature at which starting is facilitated before establishing normal flow through the cooling system, and consequently insures easy starting of the booster engine whenever load and speed conditions require the additional power. In addition, it would be impossible to run immediately at full open throttle without this preliminary heating.

It is therefore apparent that with this construction the booster engine will be heated at all times that the vehicle is in operation and the cooling system will function with increased efficiency to more rapidly heat up the main engine upon starting due to the bleeder connection 62.

I am aware that various changes may be made in certain details of the present construction, and I therefore do not intend to be limited to the exact form of the invention herein illustrated and described, but only insofar as defined by the scope and spirit of the appended claims.

I claim:

1. In combination, in a vehicle having a main engine normally driving the vehicle and a booster engine for supplementing the torque of the main engine under certain operating conditions, a coolant circulating system for the main engine, and thermally responsive means for by-passing a portion of the coolant in said system through said booster engine to maintain it at the operating temperature of said main engine.

2. In combination, in a vehicle having a main engine, a transmission connected thereto, and a booster engine for supplementing the torque of the main engine, a coolant pump mounted at said booster engine and constantly operating whenever said main engine is in operation, and a coolant circulating system having a radiator common to both engines and connected to said booster engine through said pump.

3. In combination, a vehicle having a main engine, a transmission connected thereto, a booster engine, a lay shaft geared to said transmission, an overrunning clutch between said lay shaft and said booster engine, a water pump mounted on said booster engine and driven by the constantly rotating part of said clutch, a radiator common to both engines, and a coolant circulating system therefor having a connection to said booster engine through said pump.

4. The combination of claim 3 wherein the system is connected in parallel to said engines from said radiator.

5. In combination, a main engine, a booster engine, a cooling radiator, means for circulating the fluid from said radiator through said main engine, means for circulating the fluid from said radiator through said booster engine, and means responsive to the temperature of said fluid leaving the main engine for by-passing a portion of said fluid to said booster engine.

6. In combination, a main engine, a booster engine, a cooling radiator, means for circulating fluid from said radiator through each of said engines, by-pass means between the outlet from said main engine and the inlet to said booster engine, and thermally responsive means at said main engine controlling said by-pass means.

7. In combination, in a vehicle having a main engine and a supplemental engine, a radiator common to both engines, a pump at said supplemental engine operable whenever said main engine is operating, a return connection from said main engine to said radiator, a by-pass valve in said connection for directing a portion of said fluid passing through said return connection to said pump, and thermally responsive means controlling said valve.

8. In combination, a pair of engines, a radiator common to said engines and having independent connections to each of said engines, a by-pass connection between the return conduit from one engine to the inlet conduit of the second engine, thermally responsive means at the one engine controlling said by-pass connection, and a pump in said connection to said second engine driven by said first engine.

DONALD D. ORMSBY.